(12) United States Patent
Ozawa et al.

(10) Patent No.: US 7,371,798 B2
(45) Date of Patent: May 13, 2008

(54) THERMOPLASTIC WATER-CURABLE COMPOSITION, MOLDED OBJECT MADE FROM THE THERMOPLASTIC WATER-CURABLE COMPOSITION, AND PROCESS FOR PRODUCING THE SAME

(75) Inventors: Satoshi Ozawa, Tokyo (JP); Kouji Mikami, Tokyo (JP); Shigefumi Hisatsune, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 10/498,195

(22) PCT Filed: Dec. 12, 2002

(86) PCT No.: PCT/JP02/12994

§ 371 (c)(1),
(2), (4) Date: Dec. 27, 2004

(87) PCT Pub. No.: WO03/054080

PCT Pub. Date: Jul. 3, 2003

(65) Prior Publication Data
US 2005/0124763 A1    Jun. 9, 2005

(30) Foreign Application Priority Data

Dec. 12, 2001 (JP) .............................. 2001-379239
May 31, 2002 (JP) .............................. 2002-160381

(51) Int. Cl.
C08F 8/00      (2006.01)
B32B 27/00   (2006.01)

(52) U.S. Cl. .................... 525/192; 525/92 G; 525/101; 525/246; 525/477; 524/444; 524/446; 264/426; 428/425.5

(58) Field of Classification Search ................ 525/192, 525/92 G, 101, 246, 477; 524/444, 446; 264/426; 428/425.5

See application file for complete search history.

(56) References Cited

U.S. PATENT DOCUMENTS

| | | | | |
|---|---|---|---|---|
| 4,598,116 A | * | 7/1986 | Keogh et al. ............... | 524/398 |
| 4,707,520 A | * | 11/1987 | Keogh ....................... | 525/245 |
| 4,908,166 A | * | 3/1990 | Salyer ....................... | 264/470 |
| 4,916,012 A | * | 4/1990 | Sawanobori et al. ....... | 428/367 |
| 6,013,729 A | * | 1/2000 | Tsujimoto et al. .......... | 525/105 |
| 6,331,597 B1 | * | 12/2001 | Drumright et al. ....... | 525/333.5 |
| 6,758,995 B1 | | 7/2004 | Uchida et al. | |
| 6,843,761 B1 | | 1/2005 | Uchida et al. | |

FOREIGN PATENT DOCUMENTS

| | | |
|---|---|---|
| JP | 5-155646 | 6/1993 |
| JP | 09-157069 | 6/1997 |
| JP | 2000-007411 | 1/2000 |
| JP | 2000-273253 | 10/2000 |
| JP | 2001-253739 | 9/2001 |
| JP | 2002-363429 | 12/2002 |
| WO | WO 01/90021 | 11/2001 |

* cited by examiner

*Primary Examiner*—Randy Gulakowski
*Assistant Examiner*—Olga Asinovsky
(74) *Attorney, Agent, or Firm*—Chapman and Cutler LLP

(57) ABSTRACT

A thermoplastic water-curable composition which is excellent in mechanical properties, heat resistance, dimensional stability, and moldability and from which a mechanical part of a complicated shape can be produced: a molding formed from the thermoplastic water-curable composition; and a process for producing the molding. The thermoplastic water-curable composition comprises: a thermoplastic resin which upon contact with water undergoes a cross-linking reaction and thus comes to have a high molecular weight, desirably one having silane groups in inner parts thereof and a water-curable composition, the amount of water-curable composition being desirably 200 to 700 parts by weight per 100 parts by weight of the resin The molding is formed from the thermoplastic water-curable composition. The process comprises molding the thermoplastic water-curable composition into a given shape and then bringing the molding into contact with water to age and cure it.

24 Claims, No Drawings

THERMOPLASTIC WATER-CURABLE COMPOSITION, MOLDED OBJECT MADE FROM THE THERMOPLASTIC WATER-CURABLE COMPOSITION, AND PROCESS FOR PRODUCING THE SAME

FIELD OF THE INVENTION

This invention relates to thermoplastic water-curable composition, a molded object formed from the thermoplastic water-curable composition and process for producing the same, and more particularly to thermoplastic water-curable composition which is excellent in mechanical properties, heat resistance, dimensional stability, and moldability and from which a mechanical part of a complicated shape can be easily produced a molded object formed from the thermoplastic water-curable composition, and a process for producing the molded object.

BACKGROUND OF THE INVENTION

Metallic materials have long been used in various fields as a mechanical part materials taking advantage of their excellent mechanical properties. Recently, non-metallic materials such as sintering ceramics and plastics have also become to be used for mechanical parts.

With an increasing various requirement for mechanical parts and so on, a development of novel technology on mechanical parts of novel properties has been desired.

As a result of the inventors' extensive studies to meet such requirement, we have found a water-curable composition comprising water-curable particles, non-water-curable particle whose mean particle diameter is as small as one tenth of that of water-curable particles, workability amelioration agent, and moldability amelioration agent; and have found the moldings formed from the water-curable composition by compression molding or extrusion molding can be applied for mechanical parts such as paper feed roller components. (JP,2000-7411,A, JP,2000-7179,A, JP,2001-58737,A)

However, it was difficult to apply these water-curable composition and the corresponding moldings into mechanical parts of complicated shapes, although they could be easily used for medical parts of simple shapes.

Therefore, applying water-curable composition and the responding moldings to broad use of various mechanical parts could not be expected.

The object of the present invention is to overcome the prior problem noted above and to provide thermoplastic water-curable composition which is excellent in mechanical properties, heat resistance, dimensional stability, and moldability and from which a mechanical part of a complicated shape can be produced.

Another object of the present invention is to provide the moldings produced by water curing of the water-curable composition of this invention which are excellent in mechanical properties, heat resistance and dimensional stability.

Also a further object of this invention is to provide a process of producing the moldings efficiently and economically.

SUMMARY OF THE INVENTION

The inventors found that thermoplastic water-curable composition comprising thermoplastic resin, which upon contact with water undergoes a cross-linking reaction and thus comes to have a high molecular weight, has excellent mold ability, especially excellent moldability suitable for injection-molding.

The inventors also found that the moldings obtained by curing after molding, especially injection-molding, of the thermoplastic water-curable composition have good strength higher than the moldings produced from usual thermoplastic resin, are excellent in mechanical properties, thermal physical properties, and workability, and can be formed into a complicated shape.

Then finally the inventors have accomplished this invention.

The thermoplastic water-curable composition according to this invention characterized in that it comprises water-curable composition and thermoplastic resin which upon contact with water undergoes a cross-linking reaction and thus comes to have a high molecular weight.

In a preferred embodiment of the thermoplastic water-curable composition according to the invention, said thermoplastic water-curable composition comprises water-curable composition being suitably 200-900 parts by weight per 100 parts by weight of the thermoplastic resin which upon contact with water undergoes a cross-linking reaction and thus comes to have a high molecular weight.

In another preferred embodiment of the thermoplastic water-curable composition according to the invention, said water-curable composition suitably comprises water-curable particles.

In a further preferred embodiment of the thermoplastic water-curable composition according to the invention, said water-curable composition suitably comprises water-curable particles and non-water-curable particles.

In a further preferred embodiment of the thermoplastic water-curable composition according to the invention, said thermoplastic resin, which upon contact with water undergoes a cross-linking reaction and thus comes to have a high molecular weight, suitably has silane functional groups in it.

Especially in a further preferred embodiment of the thermoplastic water-curable composition according to the invention, said thermoplastic resin, which upon contact with water undergoes a cross-linking reaction and thus comes to have a high molecular weight, is silane functionalized polyolefin such as silane-modified polymer that is selected from a group consisting of polyethylene, polypropylene, ethylene-copolymers, and propylene-copolymers which contain silane functional groups in its inner parts.

Moreover, in a further preferred embodiment of the thermoplastic water-curable composition according to the invention, said thermoplastic water-curable composition further comprises reinforcement, the amount of which is desirably 1-100 parts by weight per 100 parts by weight of the above-mentioned water-curable composition.

The molding according to this invention characterized in that it formed from the above-mentioned thermoplastic water-curable composition of this invention.

A process for producing the, moldings according to this invention comprises molding the thermoplastic water-curable composition into a given shape and then bringing the shape into contact with water to age and cure it.

In a preferred embodiment of the process for producing the moldings according to this invention, said aging and curing by contact with water is accomplished by at least one of steam curing at atmospheric pressure, steam curing at high pressure, or hot-water curing, being carried out at 20-180° C. for more than 3 hours.

DETAILED DESCRIPTION OF THE INVENTION

The preferable example for this invention is described below, but this invention is not limited to the scope of these preferred examples.

The thermoplastic water-curable composition of this invention comprises water-curable composition and thermoplastic resin which upon contact with water undergoes a cross-linking reaction and thus comes to have a high molecular weight.

The mix ratio of the above-mentioned water-curable composition and thermoplastic resin which upon contact with water undergoes a cross-linking reaction and thus comes to have a high molecular weight is varied with the degree of cross-linking and modification of the thermoplastic resin and with moldability of the water-curable composition, The preferable ratio is 200-900, more desirably 550-750, parts by weight of the water-curable composition per 100 parts by weight of the thermoplastic resin which is hardened by the crosslinking due to the reaction with water. When the ratio of the water-curable composition is less than 200 parts by weight, the strength of the molding is lowered. And when it is more than 900 parts by weight, the moldability decreases because the amount of the thermoplastic resin in the thermoplastic water-curable composition is lowered.

The thermoplastic resin used for the thermoplastic water-curable composition of this invention comprises the resin which is hardened by cross-linking reaction due to contact with water and which has plasticity so that it can be molded when heated. Preferably the thermoplastic resin that contains silane functional groups in inner parts thereof can be used.

For example, silane-modified polyolefin can be used for the above-mentioned thermoplastic resin which upon contact with water undergoes a cross-linking reaction and thus comes to have a high molecular weight. The silane-modified polyolefin includes the silane-modified polymers such as low-density polyethylene, high-density polyethylene, polypropylene and poly(4-methylpentene) which contain silane functional groups in inner parts, and one or more of them can be used for this invention.

The thermoplastic resin can be used in various methods of molding such as injection molding, extrusion molding and compression molding, and it is suitably used in injection molding.

The molecular weight of the thermoplastic resin is preferably more than 5000 or more in order to achieve better moldability of the thermoplastic water-curable composition. The upper limit of the molecular weight is desirably adjusted into the appropriate region so that the resin has good kneadability, because too high molecular weight of the resin often worsens kneadability.

The water-curable composition in the thermoplastic water-curable composition in this invention can comprise water-curable particles.

Herein the water-curable fine particles mean the particles which are hardened by water, and, preferably, at least one of the particles selected from the group consisting of Portland cement, a calcium silicate, calcium aluminates, calcium fluoro aluminates, calcium sulfoaluminate, a calcium alumino ferrite, calcium phosphate, calcined or anhydrous gypsum, and self-hardening calcined lime can be used as the water-curable fine.

Although the particle size of the above water-curable fine particles is not limited, a mean particle diameter is desirably about 10-40 micrometer to obtain good working life for molding and good strength of the molding, And Blaine's specific surf area is desirably more than 2500 $cm^2/g$ in order to achieve high strength of the molded products.

The water-curable composition used for this invention may contain non-water-curable particles in addition to the above-mentioned water-curable particles.

The non-water-curable particles mean the particles which are not hardened by contact with water by themselves, and also comprise particles from which their components leach out under basic or acidic conditions or pressurized steam to form products by the reaction with other leached compounds.

At least one of the particles selected from the group consisting of calcium-hydroxide powder, gypsum-dihydrate powder, calcium-carbonate, powder, slag powder, fly ash powder, silica powder, clay powder, and silica fume powder can be suitably used as the non-water-curable particles.

These non-water-curable particles have a function to increase the strength in the thermoplastic water-curable composition in this invention according to pozzolanic reaction or the micro filler effect.

When the thermoplastic water-curable composition is molded, especially when it is molded into a complicated shape, its high fluidity enables easy molding. For this purpose it is particularly desirable that 40-60 parts by weight of the above-mentioned non-water-curable particles consist of spherical particles whose diameters are 5-20 micrometer in order to increase its fluidity.

It is desirable that 0-80 wt %, more suitably 50-70 wt % of the water-curable composition, which is a mixture of the above-mentioned water-curable particles and non-water-curable particles, are the above-mentioned non-water-curable particles. When more than 80 wt % of the water-curable composition is the non-water-curable particles, the strength of the molding will be worsened, HDT will be lowered and coefficient of linear expansion will depend on temperature, which is not desirable.

Preferably, the thermoplastic water-curable composition of this invention contains reinforcement in order to improve its shock resistance and strength, especially tensile strength.

For example, fiber such as a glass fiber, carbon fiber, and an Amid fiber, and reinforcement fiber such as a potassium titanate whisker can be used for this reinforcement.

The length of reinforcement fiber is suitably 1-20 mm, more suitably 3-13 mm, and its gauge is suitably 5-30 micrometers from the point of the ease of preparation of a thermoplastic water-curable composition and the moldability of the thermoplastic water-curable composition obtained.

About the addition of the reinforcement, desirably 1-100, more desirably 5-70, parts by weight of it per 100 parts by weight of the above-mentioned thermoplastic resin are added. If it is more than 100 parts by weight, is causes poor shaping since the composition does not have appropriate fluidity.

In order to prepare the thermoplastic water-curable composition of this invention, the above-mentioned thermoplastic resin which upon contact with water undergoes a cross-linking reaction and thus comes to have a high molecular weight, the above-mentioned water-curable composition, and reinforcement if necessary are mixed in the ratio mentioned above. There is especially no definition on mixing methods; it is only necessary to mix them into homogeneity.

Subsequently, moldings can be manufactured using the obtained thermoplastic water-curable composition of this invention.

The moldings of this invention are manufactured as follows; after the above-mentioned thermoplastic water-curable composition of this invention is molded into a given shape to obtain uncured moldings, water is introduced to the obtained uncured moldings to age and cure it.

A method of molding, for example, injection molding, extrusion molding, compression molding and so on can be used. However any well-known thermoplastic fabricating methods can be applied besides these methods.

When injection molding is used, it is desirable that the thermoplastic water-curable composition is kneaded by melting kneading at higher temperature than softening point of thermoplastic resin contained in the thermoplastic water-curable composition of this invention, and accordingly, it is palletized for example, and used as raw material of injection molding.

The palletized raw material is again melt-kneaded in a heated cylinder inside the injection-molding machine, and filled into a metal mold of desired shape by injection machine to obtain uncured moldings.

Generally, though water-curable composition is fluid by water, it takes a long time for removal from the mold, and it is impossible to apply it into molding such as injection molding. Moreover, it is impossible to recycle defectives of the moldings because water-curable composition is hardened by hydration reaction when it is contacted with water.

However, as described above, the thermoplastic water-curable composition of this invention can be configured without using water. And it achieves the short mold removal time. And hydration reaction of the thermoplastic water-curable composition does not start at the stage of configuration because water is not used. Therefore the thermoplastic water-curable composition of this invention can be recycled many times before it is aged and cured.

Subsequently, water must be supplied after molding because water is not used in molding the obtained uncured moldings.

Although methods of curing which supply water to the uncured moldings are not limited and any well-known methods can be applied, it is desirable to cure at 20-180° C. for more than 3 hours. As methods of curing, at least one of steam curing at atmospheric pressure, steam curing at high pressure, and hot water curing can be used. Desirably, one of these methods, a combination of steam curing at atmospheric pressure and hot-water curing, or a combination of steam curing at high pressure and hot-water curing can be applied. Especially for this invention, hot water curing under pressurized conditions is desirable.

The thermoplastic resin contained in the thermoplastic water-curable Composition of this invention is cross-linked by contact with water to be cured. And the water-curable particles in the composition are also hardened with proceeding of hydration reaction by contact with water. Thus, during hydration, both of them are simultaneously cured in the presence of water. Therefore both of them from a firm matrix in the moldings to give the moldings which are much stronger than the moldings made from any known water-curable composition containing high-polymer resin.

EXAMPLE

This invention is explained in detail based on following examples, comparative examples, and test examples.

Examples 1-9, Comparative Examples 1-3

Thermoplastic water-curable compositions were prepared by mixing water-curable particles, non-water curable particles, thermoplastic resin, and reinforcement according to the blending ratio shown in Table 1. Portland cement (mean diameter 20 micrometer, NORMAL PORTLAND CEMENT, SUMITOMO OSAKA CEMENT CO., LTD) was used as water-curable particles. Fly ash (mean diameter 10 micrometer, spherical particles, CHUBU FLY ASH, TECHNO CYUBU COMPANY LTD), silica fume (mean diameter 0.2 micrometers, MICRO SILICA, SKW EAST LIMITED), and calcium carbonate (CALPET A, NITTO FUNKA KOGYO K.K.) were used as non-water curable particles. Silane-modified polyethylene (MOLDEX, SUITOMO BAKELITE COMPANY LIMITED), polyethylene (SUNTEC, ASAHI KASEI CORPARATION), or polypropylene (SUMIKON F M; SUMTOMO BAKELITE COMPANY LIMITED) were used as thermoplastic resin. Carbon fiber (C6-S, TOHO TENAX CO., LTD) was used as reinforcement. The prepared thermoplastic water-curable compositions were kneaded with a kneading machine (LABO PRASTMILL, TOYO SEIKI SEISAKU-SHO, LTD) at 220° C. for 45 minutes to obtain the pellets.

And then the injected uncured moldings of 120 mm (length)×10 mm (width)×3 mm (thickness) were prepared using these pellets. Hot water curing (160° C. for 12 hours) was conducted on the obtained uncured moldings to manufacture the moldings.

Test Example 1

The flexural strength, deflection temperature under load and coefficient of linear expansion were determined for each of obtained moldings by the tests described below. The results are shown in Table 1.

Testing Method

1) Flexural strength: The test was conducted according to JIS K 7171.
2) HTD test (test of deflection temperature under load): The test was conducted according to JIS K 7192-2A Each of the obtained moldings of 120 mm (length)×10 mm (width)×3 mm (thickness) mentioned above was supported between two fulcrums whose span is 100 mm. And it was heated up at constant rate with applying 1.8 MPa of flexural stress downward at the center of it The temperature at which its deflection amounted to the standard deflection was regarded as deflection temperature under load.

3) Coefficient of linear expansion: The test was carried out according to ASTM D-648.

Each of obtained moldings mentioned above was cut into a test piece of 3 mm (diameter) and 20 mm (length). Coefficient of linear expansion of each test piece was measured by a thermal stress distortion-measuring device (TMA/SS, SEIKO INSTRIMNTS INC.) at 30-80° C.

TABLE 1

(Parts by weight)

|  | Example 1 | Example 2 | Example 3 | Example 4 | Example 5 | Example 6 |
|---|---|---|---|---|---|---|
| Portland cement | 231 | 248 | 231 | 231 | 579 | 231 |
| Fly ash* | 174 | 186 | 348 |  |  |  |
| Silica fume | 174 | 186 |  | 348 |  |  |
| Calcium carbonate |  |  |  |  |  | 348 |
| Silane-modified polyethylene | 100 | 100 | 100 | 100 | 100 | 100 |
| Polyethylene |  |  |  |  |  |  |
| Polypropylene |  |  |  |  |  |  |
| Carbon fiber | 58 | 58 | 58 | 58 | 58 | 58 |
| Flexural strength (N/mm$^2$) | 76 | 85 | 73 | 83 | 92 | 82 |
| HDT/° C. | 180 | 184 | 175 | 181 | 184 | 180 |
| Coefficient of linear expansion (×10$^{-7}$) | 68 | 65 | 66 | 67 | 66 | 68 |
| Moldability** | Very good | Very good | Good | Good | Good | Good |

|  | Example 7 | Example 8 | Example 9 | Comparative Example 1 | Comparative Example 2 | Comparative Example 3 |
|---|---|---|---|---|---|---|
| Portland cement | 579 | 231 | 248 |  | 231 | 231 |
| Fly ash* |  | 174 | 186 | 290 | 174 | 174 |
| Silica fume |  | 174 | 186 | 290 | 174 | 174 |
| Calcium carbonate |  |  |  |  |  |  |
| Silane-modified polyethylene | 100 | 100 | 100 | 100 |  |  |
| Polyethylene |  |  |  |  | 100 |  |
| Polypropylene |  |  |  |  |  | 100 |
| Carbon fiber |  |  |  | 58 | 58 | 58 |
| Flexural strength (N/mm$^2$) | 81 | 69 | 77 | 40 | 25 | 32 |
| HDT/° C. | 180 | 180 | 184 | 87 | 135 | 140 |
| Coefficient of linear expansion (×10$^{-7}$) | 108 | 108 | 108 | 540 | 95 | 98 |
| Moldability** | good | good | good | good | good | good |

*Fly ash (mean diameter = 10 micrometer)
**Moldability
Very good: Injected easily during injection molding and the molding have a satisfying shape.
Good: Slightly difficult to inject, but the molding has a satisfying shape.
No good: Difficult to inject and the molding does not have a satisfying shape.

The above data indicates that the moldings of examples 1-9, which were obtained by using the thermoplastic water-curable compositions of this invention, are excellent in flexural strength, HDT and coefficient of linear expansion.

It is obvious that the molding of comparative example 1, which contains the same ratio of thermoplastic resin as the example 1 but does not contain water-curable particles, is inferior to that of the example 1 in the mechanical properties noted above.

Comparative examples 2 and 3 show the moldings obtained by using thermoplastic resins which upon contact with water do not undergo a cross-linking reaction and thus do not come to have a high molecular weight. Example 1, in which the molding was prepared with same blending ratio as the comparative examples 2 and 3, exhibits about three times larger value in flexural strength than observed in comparative examples 2and 3.

A study of the above results will show that spherical fly ash that is mixed with 40-60wt % of non-curable particles increases fluidity, and achieves better moldability in injection Examples 10-18, Comparative examples 4-6

The thermoplastic water-curable compositions were prepared as described in example 1, according to the blending ratio shown in Table2. The obtained thermoplastic water-curable compositions were heat-kneaded at 220° C. for 45 minutes using heated roll to obtain pellets.

And then the injected moldings of 120 mm (length)×10 mm (width)×3 mm (thickness) were prepared using these pellets. Steam curing at atmospheric pressure (100° C. for 12 hours) was conducted on the obtained uncured moldings to manufacture the moldings.

Test Example 2

The flexural strength, deflection temperature under load and coefficient of linear expansion were determined for the obtained moldings by the test conducted in the test example 1. The results are shown in the following Table 2.

TABLE 2

(Parts by weight)

| | Example 10 | Example 11 | Example 12 | Example 13 | Example 14 | Example 15 |
|---|---|---|---|---|---|---|
| Portland cement | 231 | 248 | 231 | 231 | 579 | 231 |
| Fly ash* | 174 | 186 | 348 | | | |
| Silica fume | 174 | 186 | | 348 | | |
| Calcium carbonate | | | | | | 348 |
| Silane-modified polyethylene | 100 | 100 | 100 | 100 | 100 | 100 |
| Polyethylene | | | | | | |
| Polypropylene | | | | | | |
| Carbon fiber | 58 | 62 | 58 | 58 | 58 | 58 |
| Flexural strength (N/mm$^2$) | 59 | 68 | 69 | 70 | 92 | 76 |
| HDT/° C. | 175 | 180 | 165 | 183 | 180 | 180 |
| Coefficient of linear expansion (×10$^{-7}$) | 69 | 67 | 66 | 70 | 69 | 68 |
| Moldability** | Very good | Very good | Good | Good | Good | Good |

| | Example 16 | Example 17 | Example 18 | Comparative Example 4 | Comparative Example 5 | Comparative Example 6 |
|---|---|---|---|---|---|---|
| Portland cement | 579 | 231 | 248 | | 231 | 231 |
| Fly ash* | | 174 | 186 | 290 | 174 | 174 |
| Silica fume | | 174 | 186 | 290 | 174 | 174 |
| Calcium carbonate | | | | | | |
| Silane-modified polyethylene | 100 | 100 | 100 | 100 | | |
| Polyethylene | | | | | 100 | |
| Polypropylene | | | | | | 100 |
| Carbon fiber | | | | 58 | 58 | 58 |
| Flexural strength(N/mm$^2$) | 66 | 55 | 62 | 40 | 22 | 30 |
| HDT/° C. | 180 | 175 | 180 | 87 | 130 | 138 |
| Coefficient of linear expansion (×10$^{-7}$) | 99 | 98 | 97 | 540 | 95 | 100 |
| Moldability** | Good | Good | Good | Good | Good | Good |

*Fly ash (mean diameter = 10 micrometer)
**Moldability
Very good: Injected easily during injection molding and the molding has a satisfying shape.
Good: Slightly difficult to inject, but the molding has a satisfying shape.
No good: Difficult to inject and the molding does not have a satisfying shape.

The above data indicate that the moldings of examples 10-18 which were obtained by using the thermoplastic water-curable compositions of this invention are excellent in flexural strength, HDT and coefficient of linear expansion.

Also it was confirmed that aging and curing by steam curing at atmospheric pressure give rise to necessary and sufficient mechanical properties such as mechanical strength.

INDUSTRIAL APPLICABILITY

The thermoplastic water-curable composition of this invention enables manufacturing mechanical parts, which are excellent in mechanical properties, heat resistance, dimensional stability, and moldability and are of a complicated shape.

The obtained moldings using the thermoplastic water-curable composition of this invention have good mechanical properties such as mechanical strength, heat resistance, dimensional stability, and the moldings of complicated shape can be manufactured.

The invention claimed is:

1. A cement composition comprising:
Portland cement; and
a thermoplastic resin; wherein
the composition comprises the Portland cement in an amount of 200-900 parts by weight per 100 parts by weight of the thermoplastic resin,
the thermoplastic resin has a molecular weight greater than 5000,
the thermoplastic resin undergoes a cross-linking reaction upon contact with water to form a cross-linked structure, and
the Portland cement undergoes a hydration reaction upon contact with water simultaneously with the cross-linking reaction of the thermoplastic resin.

2. The cement composition according to claim 1, wherein the thermoplastic resin contains silane functional groups.

3. The cement composition according to claim 1, wherein the thermoplastic resin is selected from the group consisting of polyethylene, polypropylene, ethylene copolymer and polypropylene copolymer which have silane functional groups in inner parts thereof.

4. The cement composition according to claim 1, wherein the thermoplastic resin is silane-modified polyethylene.

5. The cement composition according to claim 1, wherein the cement composition further comprises at least one strengthener selected from the group consisting of calcium carbonate powder, fly ash powder, and silica fume powder.

6. The cement composition according to claim 1, wherein the cement composition further comprises at least one reinforcement selected from the group consisting of carbon fiber, glass fiber, aramid fiber, and potassium titanate whisker.

7. The cement composition according to claim 4, further comprising fly ash powder as a strengthener.

8. The cement composition according to claim 4, further comprising silica fume powder as a strengthener.

9. The cement composition according to claim 4, further comprising calcium carbonate powder as a strengthener.

10. The cement composition according to claim 7, further comprising silica fume powder as a strengthener.

11. The cement composition according to claim 4, further comprising carbon fiber as a reinforcement.

12. The cement composition according to claim 7, further comprising carbon fiber as a reinforcement.

13. The cement composition according to claim 8, further comprising carbon fiber as a reinforcement.

14. The cement composition according to claim 9, further comprising carbon fiber as a reinforcement.

15. A molding formed from the cement composition of claim 1.

16. A molding formed from the cement composition of claim 4.

17. A molding formed from the cement composition of claim 7.

18. A molding formed from the cement composition of claim 8.

19. A molding formed from the cement composition of claim 9.

20. A molding formed from the cement composition of claim 11.

21. A process for producing moldings comprising the steps of:

molding the cement composition of claim 1 into given shaped uncured moldings, and then bringing the uncured moldings into contact with water to age and cure them.

22. A process for producing moldings as set forth in claim 21, wherein curing by contact with water is conducted at 20-180° C. for more than 3 hours by at least one of steam-curing at atmospheric pressure, steam-curing at high pressure, and hot-water curing.

23. A process for producing moldings comprising the steps of:

molding the cement composition of claim 4 into given shaped uncured moldings, and then bringing the uncured moldings into contact with water to age and cure them.

24. A process for producing moldings as set forth in claim 23, wherein curing by contact with water is conducted at 20-180° C. for more than 3 hours by at least one of steam-curing at atmospheric pressure, steam-curing at high pressure, and hot-water curing.

* * * * *